United States Patent
Reddy

(10) Patent No.: US 10,450,497 B2
(45) Date of Patent: *Oct. 22, 2019

(54) LOSS CIRCULATION COMPOSITIONS (LCM) HAVING PORTLAND CEMENT CLINKER

(71) Applicant: Saudi Arabian Oil Company, Dhahran (SA)

(72) Inventor: B. Raghava Reddy, Pearland, TX (US)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/440,585

(22) Filed: Jun. 13, 2019

(65) Prior Publication Data

US 2019/0292434 A1 Sep. 26, 2019

Related U.S. Application Data

(60) Continuation of application No. 15/962,720, filed on Apr. 25, 2018, which is a division of application No.
(Continued)

(51) Int. Cl.
*C09K 8/487* (2006.01)
*C04B 28/04* (2006.01)
(Continued)

(52) U.S. Cl.
CPC ............ *C09K 8/487* (2013.01); *C04B 14/045* (2013.01); *C04B 14/22* (2013.01); *C04B 14/42* (2013.01);
(Continued)

(58) Field of Classification Search
None
See application file for complete search history.

(56) References Cited

U.S. PATENT DOCUMENTS 2,933,135 A   4/1960  Johnson
3,053,764 A   9/1962  Hummel et al.
(Continued)

FOREIGN PATENT DOCUMENTS

CN    101560084 A    10/2009
CN    103570298 A    2/2014
(Continued)

OTHER PUBLICATIONS

"About clinker," cement kilns, retrieved Feb. 28, 2018 from http://www.cementkilns.co.uk/ck_clinker.html (Year: 2018); pp. 1-5.
(Continued)

*Primary Examiner* — Angela M DiTrani Leff
(74) *Attorney, Agent, or Firm* — Bracewell LLP; Constance G. Rhebergen; Brian H. Tompkins

(57) ABSTRACT

Portland cement clinker LCMs that include Portland cement clinker to mitigate or prevent lost circulation in a well are provided. A Portland cement clinker LCM may include Portland cement clinker, Portland cement, a carrier fluid, and an inorganic consolidation activator. Another Portland cement clinker LCM may include Portland cement clinker and a crosslinked fluid, such as a polyuronide crosslinked via calcium ions or a polysaccharide crosslinked via divinyl sulfone. Yet another Portland cement clinker LCM may include Portland cement clinker and polymer fibers or particulate glass. Methods of lost circulation control using a Portland cement clinker LCM are also provided.

4 Claims, 3 Drawing Sheets

Related U.S. Application Data

15/788,461, filed on Oct. 19, 2017, now Pat. No. 10,144,860.

(60) Provisional application No. 62/535,024, filed on Jul. 20, 2017.

(51) Int. Cl.

| | | |
|---|---|---|
| C04B 14/04 | (2006.01) | |
| C04B 22/12 | (2006.01) | |
| E21B 33/138 | (2006.01) | |
| C04B 14/22 | (2006.01) | |
| C04B 14/42 | (2006.01) | |
| C04B 16/06 | (2006.01) | |
| C09K 8/32 | (2006.01) | |
| C09K 8/12 | (2006.01) | |
| C09K 8/08 | (2006.01) | |
| C09K 8/42 | (2006.01) | |
| E21B 21/00 | (2006.01) | |
| C09K 8/516 | (2006.01) | |
| C09K 8/514 | (2006.01) | |
| C09K 8/508 | (2006.01) | |
| C09K 8/506 | (2006.01) | |
| C09K 8/504 | (2006.01) | |
| C04B 28/26 | (2006.01) | |
| C04B 28/06 | (2006.01) | |
| C04B 26/28 | (2006.01) | |
| C04B 22/00 | (2006.01) | |
| C04B 103/00 | (2006.01) | |
| C04B 103/12 | (2006.01) | |

(52) U.S. Cl.
CPC ...... *C04B 16/0633* (2013.01); *C04B 16/0658* (2013.01); *C04B 22/0093* (2013.01); *C04B 22/124* (2013.01); *C04B 26/28* (2013.01); *C04B 26/285* (2013.01); *C04B 28/04* (2013.01); *C04B 28/06* (2013.01); *C04B 28/26* (2013.01); *C09K 8/08* (2013.01); *C09K 8/12* (2013.01); *C09K 8/32* (2013.01); *C09K 8/426* (2013.01); *C09K 8/506* (2013.01); *C09K 8/508* (2013.01); *C09K 8/5045* (2013.01); *C09K 8/514* (2013.01); *C09K 8/516* (2013.01); *E21B 21/003* (2013.01); *E21B 33/138* (2013.01); *C04B 2103/0028* (2013.01); *C04B 2103/0062* (2013.01); *C04B 2103/0067* (2013.01); *C04B 2103/12* (2013.01); *C09K 2208/08* (2013.01)

(56) References Cited

U.S. PATENT DOCUMENTS

| | | | |
|---|---|---|---|
| 3,147,127 A | 9/1964 | Shannon | |
| 3,219,109 A | 11/1965 | Stein | |
| 3,366,177 A | 1/1968 | Powers et al. | |
| 3,729,052 A | 4/1973 | Caldwell | |
| 3,888,311 A | 6/1975 | Cooke, Jr. | |
| 3,953,222 A | 4/1976 | Bainton | |
| 4,086,098 A | 4/1978 | Le Ruyet et al. | |
| 4,127,548 A | 11/1978 | Alexander | |
| 4,784,693 A | 11/1988 | Kirkland et al. | |
| 5,529,123 A | 6/1996 | Carpenter et al. | |
| 5,728,209 A | 3/1998 | Bury et al. | |
| 6,173,778 B1 | 1/2001 | Rae et al. | |
| 6,257,336 B1 | 7/2001 | Audibert et al. | |
| 6,800,129 B2 | 10/2004 | Jardine et al. | |
| 6,814,798 B2 | 11/2004 | Vijn et al. | |
| 6,815,399 B1 | 11/2004 | Johnson et al. | |
| 7,044,224 B2 | 5/2006 | Nguyen | |
| 7,147,067 B2 | 12/2006 | Getzlaf et al. | |
| 7,182,137 B2 | 2/2007 | Fyten et al. | |
| 7,281,581 B2 | 10/2007 | Nguyen et al. | |
| 7,325,608 B2 | 2/2008 | Van Batenburg et al. | |
| 7,332,026 B2 | 2/2008 | Fyten et al. | |
| 7,424,913 B2 | 9/2008 | Roddy | |
| 7,448,450 B2 | 11/2008 | Luke et al. | |
| 7,478,675 B2 | 1/2009 | Roddy et al. | |
| 7,493,968 B2 | 2/2009 | Reddy et al. | |
| 7,743,828 B2 | 6/2010 | Roddy et al. | |
| 7,744,689 B2 | 6/2010 | Hojaji | |
| 7,897,546 B2 | 3/2011 | Showalter et al. | |
| 8,083,851 B2 | 12/2011 | Crudden et al. | |
| 8,540,025 B2 | 9/2013 | Reddy et al. | |
| 8,636,069 B2 | 1/2014 | Reddy et al. | |
| 8,733,439 B1 | 5/2014 | Bakshi | |
| 9,376,607 B2 | 6/2016 | James | |
| 9,505,659 B2 | 11/2016 | Bickbau | |
| 9,567,841 B2 | 2/2017 | Rothrock et al. | |
| 9,670,762 B2 | 6/2017 | Nguyen et al. | |
| 9,776,919 B2 | 10/2017 | Sabio et al. | |
| 9,796,903 B2 | 10/2017 | Agapiou et al. | |
| 9,896,903 B2 | 2/2018 | Fonseca Ocampos et al. | |
| 10,246,626 B2 * | 4/2019 | Reddy | C09K 8/12 |
| 10,301,529 B2 | 5/2019 | Reddy | |
| 10,323,171 B2 * | 6/2019 | Reddy | C09K 8/487 |
| 10,323,172 B2 * | 6/2019 | Reddy | C09K 8/487 |
| 10,329,473 B2 * | 6/2019 | Reddy | C09K 8/487 |
| 2004/0014608 A1 | 1/2004 | Nguyen et al. | |
| 2006/0081369 A1 | 4/2006 | Kriegal | |
| 2007/0034118 A1 | 2/2007 | Jardine et al. | |
| 2007/0056730 A1 | 3/2007 | Keese et al. | |
| 2007/0204992 A1 | 9/2007 | Davis et al. | |
| 2009/0205824 A1 | 8/2009 | Sullivan et al. | |
| 2009/0305038 A1 | 12/2009 | Duran et al. | |
| 2011/0067867 A1 | 3/2011 | Reddy et al. | |
| 2012/0145387 A1 | 6/2012 | Pyatina et al. | |
| 2013/0161003 A1 | 6/2013 | Makarychev-Mikhailov et al. | |
| 2013/0319672 A1 | 12/2013 | Reddy et al. | |
| 2014/0251614 A1 | 9/2014 | Muthusamy et al. | |
| 2014/0374097 A1 | 12/2014 | Morgan et al. | |
| 2015/0021098 A1 | 1/2015 | Kippie | |
| 2015/0218905 A1 | 8/2015 | Chatterji et al. | |
| 2015/0299042 A1 | 10/2015 | Hesse et al. | |
| 2016/0096988 A1 | 4/2016 | Lin et al. | |
| 2016/0237341 A1 | 8/2016 | Bhamidipati et al. | |
| 2016/0264839 A1 | 9/2016 | Mata et al. | |
| 2017/0174571 A1 | 6/2017 | Dubey | |
| 2017/0210669 A1 | 7/2017 | Gu et al. | |

FOREIGN PATENT DOCUMENTS

| | | |
|---|---|---|
| CN | 103332919 B | 7/2015 |
| CN | 105541159 A | 5/2016 |
| CN | 106317321 A | 1/2017 |
| EP | 0375081 A1 | 6/1990 |
| EP | 1004557 A1 | 5/2000 |
| EP | 3087843 A1 | 11/2016 |
| GB | 1353134 A | 5/1974 |
| WO | 2010019535 A2 | 2/2010 |
| WO | 2011012921 A1 | 2/2011 |
| WO | 2015138453 A1 | 9/2015 |
| WO | 2017039652 A1 | 3/2017 |
| WO | 2017048222 A1 | 3/2017 |
| WO | 2017048230 A1 | 3/2017 |
| WO | 2017052515 A1 | 3/2017 |

OTHER PUBLICATIONS

ChemSpider; "Divinyl sulfone" accessible as of Jul. 11, 2018 at the website: http://www.chemspider.com/Chemical-Structure.6251.html.

DifferenceBetween.com; "Difference Between Clinker and Cement" Oct. 23, 2011, available as of Jun. 4, 2018 at https://www.differencebetween.com/difference-between-clinker-and-vs-cement/; pp. 1-5.

International Search Report and Written Opinion for International Application No. PCT/US2018/041917 (SA5701); International Filing Date Jul. 13, 2018; Report dated Oct. 1, 2018 (pp. 1-14).

(56) References Cited

OTHER PUBLICATIONS

International Search Report and Written Opinion for International Application No. PCT/US2018/041918 (SA5702) International Filing Date Jul. 13, 2018; Report dated Oct. 23, 2018 (pp. 1-18).
International Search Report and Written Opinion for International Application No. PCT/US2018/041919 (SA5703); International Filing Date Jul. 13, 2018; Report dated Oct. 1, 2018 (pp. 1-14).
Understanding Cement; "Portland cement clinker—overview" available as of Oct. 18, 2018 at the website: https://www.understanding-cement.com/clinker.html; pp. 1-6.
Wastes—Non-Hazardous Waste—Industrial Waste; "Cement Kiln Dust Waste" Special Wastes, Wastes, US EPA, accessible as of Apr. 19, 2016 at the website: https://archive.epa.gov/epawaste/nonhaz/industrial/special/web/html/index-2.html; pp. 1-3.
Wikipedia; "Clinker (cement)" accessible as of Jul. 11, 2018 at the website: https://en.wikipedia.org/wiki/Clinker_(cement); pp. 1-3.

\* cited by examiner

LOSS CIRCULATION COMPOSITIONS (LCM) HAVING PORTLAND CEMENT CLINKER

CROSS-REFERENCE TO RELATED APPLICATIONS

This application is a continuation of and claims priority from U.S. Non-provisional application Ser. No. 15/962,720 filed Apr. 25, 2018, and titled "LOSS CIRCULATION COMPOSITIONS (LCM) HAVING PORTLAND CEMENT CLINKER," which is a divisional of and claims priority from U.S. Non-provisional application Ser. No. 15/788,461 filed Oct. 19, 2017, and titled "LOSS CIRCULATION COMPOSITIONS (LCM) HAVING PORTLAND CEMENT CLINKER," which claims priority from U.S. Provisional Application No. 62/535,024 filed Jul. 20, 2017, and titled "LOSS CIRCULATION COMPOSITIONS (LCM) HAVING PORTLAND CEMENT CLINKER," each of which are incorporated by reference in their entirety for purposes of United States patent practice.

BACKGROUND

Field of the Disclosure

The present disclosure generally relates to controlling lost circulation in a well, such as during drilling or cementing operations. More specifically, embodiments of the disclosure relate to lost circulation materials (LCMs).

Description of the Related Art

Various challenges are encountered during drilling and production operations of oil and gas wells. For example, fluids used in drilling, completion, or servicing of a wellbore can be lost to the subterranean formation while circulating the fluids in the wellbore. Such lost circulation can be encountered during any stage of operations and occurs when fluid (such as drilling fluid) pumped into a well returns partially or does not return to the surface. Lost circulation may be associated with problems with well control, borehole instability, pipe sticking, unsuccessful production tests, inadequate zonal isolation, poor hydrocarbon production after well completion, and formation damage due to plugging of pores and pore throats by mud particles. Lost circulation can occur in various formations, such as naturally fractured formations, cavernous formations, and high permeability formations. The extent of the fluid loss and the ability to control the lost circulation with an LCM depends on the type of formation in which the lost circulation occurs, as well as on the dimensions of the loss circulation zone. The costs incurred in lost circulation situations may be due to lost time, losses of drilling fluids, and losses of production.

SUMMARY

Lost circulation materials (LCMs) are used to mitigate lost circulation by blocking the path of the wellbore fluid (for ex., a drilling fluid) into the formation. The type of LCM used in a lost circulation situation depends on the extent of lost circulation and the type of formation. Lost circulation materials may include different types, such as fibrous materials, flaky materials, granular materials, and so on. Existing LCMs may perform poorly in mitigation and prevention of lost circulation in certain formations. For example, large vugular openings within the loss zones of karst formations (e.g., dolomite formations) may consume all fluids and solids are pumped downhole during drilling. This includes cement, large pieces of ground marble, and various lost circulation materials in the forms of fibers, flakes, particles, high fluid loss squeezes, and settable resins. Existing LCMs are problematic in such formations as they do not provide a way to form a mechanically competent and pressure resistant seal, especially when the losses are severe.

Cement clinker is produced during the production of cement in a cement kiln, typically at temperatures around 1600° C. After cooling, the clinker may contain a mixture a powder, irregularly shaped chunks, and spherical balls. To produce usable cement, the cement clinker is mixed with grinding aids and anti-flash setting agents and ground to a desired particle size. However, when clinker is mixed with water it does not set like cement and common cement set accelerators are not effective in activating clinker material and producing a cohesive set cement with compressive strengths in the range suitable for ground cement. A contributing factor for the clinker behavior is due to the decrease in the reactive surface area because of the larger particle sizes, and the inability of water to reach and hydrate the all the available cementiceous components. A portion of clinker may include relatively larger particles that are difficult to suspend in an aqueous carrier fluid, a problem compounded by the specific gravity of cement being about 3.15 times higher than the specific gravity of water.

Embodiments of the disclosure include Portland cement clinker LCMs that include Portland cement clinker to mitigate or prevent lost circulation in a well. Advantageously, the different particle sizes of the clinker used in the cement clinker LCM compositions can pack together to form tightly packed plugs of relatively low permeability. Moreover, even partial setting of the clinker or cement used in the cement clinker composition can decrease the permeability of the formed plugs and increase the strength of the plug and further improve the mitigation or prevention of loss of wellbore fluids in lost circulation zones.

In one embodiment, an LCM composition is provided that includes Portland cement clinker, cement, a carrier fluid, and an inorganic consolidation activator selected to consolidate the clinker in the composition to form a plug when introduced into a lost circulation zone. In some embodiments, the carrier fluid is an aqueous carrier fluid that includes at least one of diutan gum, xanthan gum, and welan gum. In some embodiments, the Portland cement clinker is ASTM International Type I cement clinker, ASTM International Type V cement clinker, API Class A cement clinker, or API Class G cement clinker. In some embodiments, the cement is API Class G cement. In some embodiments, the inorganic consolidation activator includes a silicate salt. In some embodiments, the inorganic consolidation activator includes at least one of sodium silicate, calcium aluminate, calcium chloride, sodium aluminate, and potassium silicate. In some embodiments, the inorganic consolidation activator is an amount in the range of about 1.0 weight of the total weight (w/w %) to about 3.0 w/w %. In some embodiments, the weight ratio of carrier fluid to clinker is 1:1. In some embodiments, the weight ratio of cement clinker to cement is in the range of 60:40 to 70:30. In some embodiments, the LCM composition includes a plurality of polymer fibers. In some embodiments, the polymer fibers include polypropylene fibers. In some embodiments, the LCM composition includes particulate glass having an aspect ratio greater than or less than 1. In some embodiments, the particulate glass includes a plurality of glass fibers or a plurality of glass flakes.

In another embodiment, a method to control lost circulation in a lost circulation zone in a wellbore is provided that includes introducing a lost circulation material (LCM) into the wellbore such that the LCM contacts the lost circulation zone and reduces a rate of lost circulation into the lost circulation zone as compared to a period before introducing the LCM. The LCM includes Portland cement clinker, cement, a carrier fluid, and an inorganic consolidation activator selected to consolidate the clinker in the composition to form a plug when introduced into a lost circulation zone. In some embodiments, the carrier fluid is an aqueous carrier fluid that includes at least one of diutan gum, xanthan gum, and welan gum. In some embodiments, the Portland cement clinker is ASTM International Type I cement clinker, ASTM International Type V cement clinker, API Class A cement clinker, or API Class G cement clinker. In some embodiments, the cement is API Class G cement. In some embodiments, the inorganic consolidation activator includes a silicate salt. In some embodiments, the inorganic consolidation activator includes at least one of sodium silicate, calcium aluminate, calcium chloride, sodium aluminate, and potassium silicate. In some embodiments, the inorganic consolidation activator is an amount in the range of about 1.0 weight of the total weight (w/w %) to about 3.0 w/w %. In some embodiments, the weight ratio of carrier fluid to clinker is 1:1. In some embodiments, the weight ratio of cement clinker to cement is in the range of 60:40 to 90:10. In some embodiments, the method includes maintaining the LCM in contact with the lost circulation zone for a time period, such that the LCM forms a plug. In some embodiments, the time period is in the range of 24 hours to 76 hours. In some embodiments, the lost circulation zone is located in a karst formation. In some embodiments, introducing the lost circulation material (LCM) into the wellbore includes mixing the LCM with water to form a mixture and pumping the mixture into the lost circulation zone.

In another embodiment, an LCM composition is provided that includes Portland cement clinker and a polyuronide selected to crosslink in the presence of calcium dissolved from the clinker by an aqueous fluid. In some embodiments, the Portland cement clinker includes ASTM International Type I cement clinker, ASTM International Type V cement clinker, API Class A cement clinker, or API Class G cement clinker. In some embodiments, the polyuronide includes an alginate or a pectin. In some embodiments, the polyuronide includes apple pectin or citrus pectin. In some embodiments, the polyuronide is an amount in the range of 0.5 weight of the total weight (w/w %) by weight of water to 3 w/w % by weight of water. In some embodiments, the cement clinker includes a plurality of particles each having a diameter greater than 1 centimeter.

In another embodiment, a method to control lost circulation in a lost circulation zone in a wellbore is provided that includes introducing a lost circulation material (LCM) into the wellbore such that the LCM contacts the lost circulation zone and reduces a rate of lost circulation into the lost circulation zone as compared to a period before introducing the LCM. The LCM composition includes Portland cement clinker and a polyuronide selected to crosslink in the presence of calcium dissolved from the clinker. In some embodiments, the Portland cement clinker includes ASTM International Type I cement clinker, ASTM International Type V cement clinker, API Class A cement clinker, or API Class G cement clinker. In some embodiments, the polyuronide includes an alginate or a pectin. In some embodiments, the polyuronide includes apple pectin or citrus pectin. In some embodiments, the polyuronide is an amount in the range of 0.5 weight of the total weight (w/w %) by weight of water to 3 w/w % by weight of water. In some embodiments, the cement clinker includes a plurality of particles each having a diameter greater than 1 centimeter. In some embodiments, the method includes maintaining the LCM in contact with the lost circulation zone for a time period, such that the LCM forms a plug. In some embodiments, the time period is in the range of 24 hours to 76 hours. In some embodiments, the lost circulation zone is located in a karst formation. In some embodiments, introducing the lost circulation material (LCM) into the wellbore includes mixing the LCM with water having dissolved polyuronide to form a mixture and pumping the mixture into the lost circulation zone.

In another embodiment, an LCM composition is provided that includes Portland cement clinker, a biopolymer, and divinyl sulfone (DVS), the biopolymer selected to crosslink in the presence of the DVS. In some embodiments, the Portland cement clinker includes ASTM International Type I cement clinker, ASTM International Type V cement clinker, API Class A cement clinker, or API Class G cement clinker. In some embodiments, the biopolymer includes at least one of: xanthan gum, hydroxyethyl cellulose, diutan gum, welan gum and guar gum. In some embodiments, the biopolymer includes a combination of xanthan gum and guar gum. In some embodiments, the biopolymer is an amount in the range of 0.5 weight of the total weight (w/w %) to 0.8 w/w %. In some embodiments, the weight ratio of biopolymer to DVS is in the range of 1:1 to 1:0.5. In some embodiments, the LCM composition includes sodium hydroxide in an amount sufficient to adjust the pH of a solution of the polysaccharide and DVS to at least 8.5. In some embodiments, the cement clinker includes a plurality of particles each having a diameter greater than 1 centimeter.

In another embodiment, a method to control lost circulation in a lost circulation zone in a wellbore is provided that includes introducing a lost circulation material (LCM) into the wellbore such that the LCM contacts the lost circulation zone and reduces a rate of lost circulation into the lost circulation zone as compared to a period before introducing the LCM. The LCM composition includes Portland cement clinker, a biopolymer, and divinyl sulfone (DVS), the biopolymer selected to crosslink in the presence of the DVS. In some embodiments, the Portland cement clinker includes ASTM International Type I cement clinker, ASTM International Type V cement clinker, API Class A cement clinker, or API Class G cement clinker. In some embodiments, the biopolymer includes at least one of: xanthan gum, hydroxyethyl cellulose, diutan gum, welan gum and guar gum. In some embodiments, the biopolymer includes a combination of xanthan gum and guar gum. In some embodiments, the biopolymer is an amount in the range of 0.5 weight of the total weight (w/w %) to 0.8 w/w %. In some embodiments, the weight ratio of biopolymer to DVS is in the range of 1:1 to 1:0.5. In some embodiments, the LCM composition includes sodium hydroxide in an amount sufficient to adjust the pH of the LCM composition to at least 8.5. In some embodiments, the cement clinker includes a plurality of particles each having a diameter greater than 1 centimeter. In some embodiments, the method includes maintaining the LCM in contact with the lost circulation zone for a time period, such that the LCM forms a plug. In some embodiments, the time period is in the range of 24 hours to 76 hours. In some embodiments, the lost circulation zone is located in a karst formation. In some embodiments, introducing the lost circulation material (LCM) into the wellbore includes mixing the LCM with water to form a mixture and pumping the mixture into the lost circulation zone.

In another embodiment, an LCM composition is provided that includes Portland cement clinker, a carrier fluid, and a plurality of polymer fibers. In some embodiments, the plurality of polymer fibers includes a plurality of polypropylene fibers. In some embodiments, the plurality of polymer fibers each have a length in the range of 1 millimeters (mm) to 6 millimeters. In some embodiments, the plurality of polymer fibers includes a plurality of polyacrylonitrile fibers. In some embodiments, the plurality of polymer fibers is an amount in the range of 0.25 weight of the total weight (w/w %) to 1.0 w/w %. In some embodiments, the carrier fluid includes at least one of diutan gum, xanthan gum, and welan gum. In some embodiments, the Portland cement clinker includes ASTM International Type I cement clinker, ASTM International Type V cement clinker, API Class A cement clinker, or API Class G cement clinker. In some embodiments, the LCM composition includes cement. In some embodiments, the cement includes API Class G cement. In some embodiments, the weight ratio of cement clinker to cement is in the range of 60:40 to 90:10.

In another embodiment, a method to control lost circulation in a lost circulation zone in a wellbore is provided that includes introducing a lost circulation material (LCM) into the wellbore such that the LCM contacts the lost circulation zone and reduces a rate of lost circulation into the lost circulation zone as compared to a period before introducing the LCM. The LCM composition includes Portland cement clinker, a carrier fluid, and a plurality of polymer fibers. In some embodiments, the plurality of polymer fibers includes a plurality of polypropylene fibers. In some embodiments, the plurality of polymer fibers each have a length in the range of 1 millimeters (mm) to 6 millimeters. In some embodiments, the plurality of polymer fibers is an amount in the range of 0.25 weight of the total weight (w/w %) to 1.0 w/w %. In some embodiments, the carrier fluid includes at least one of diutan gum, xanthan gum, and welan gum. In some embodiments, the Portland cement clinker includes ASTM International Type I cement clinker, ASTM International Type V cement clinker, or API Class G cement clinker. In some embodiments, the LCM composition includes cement. In some embodiments, the cement includes API Class G cement. In some embodiments, the weight ratio of cement clinker to cement is in the range of 60:40 to 90:10. In some embodiments, the method includes maintaining the LCM in contact with the lost circulation zone for a time period, such that the LCM forms a plug. In some embodiments, the time period is in the range of 24 hours to 76 hours. In some embodiments, the lost circulation zone is located in a karst formation. In some embodiments, introducing the lost circulation material (LCM) into the wellbore includes mixing the LCM with water to form a mixture and pumping the mixture into the lost circulation zone.

In another embodiment, an LCM composition is provided that includes Portland cement clinker, a carrier fluid, and particulate glass having an aspect ratio greater than 1 or less than 1. In some embodiments, the particulate glass is a plurality of glass fibers each have a length in the range of 1 millimeters (mm) to 6 millimeters. In some embodiments, the particulate glass is an amount in the range of 0.25 weight of the total weight (w/w %) to 2.0 w/w %. In some embodiments, the carrier fluid is an aqueous carrier fluid that includes at least one of diutan gum, xanthan gum, and welan gum. In some embodiments, the Portland cement clinker includes ASTM International Type I cement clinker, ASTM International Type V cement clinker, API Class A cement clinker, or API Class G cement clinker. In some embodiments, the LCM composition includes cement. In some embodiments, the cement includes API Class G cement. In some embodiments, the weight ratio of cement clinker to cement is in the range of 60:40 to 90:10.

In another embodiment, a method to control lost circulation in a lost circulation zone in a wellbore is provided that includes introducing a lost circulation material (LCM) into the wellbore such that the LCM contacts the lost circulation zone and reduces a rate of lost circulation into the lost circulation zone as compared to a period before introducing the LCM. The LCM composition includes Portland cement clinker, a carrier fluid, and particulate glass having an aspect ratio greater than 1 or less than 1. In some embodiments, the particulate glass each have a length in the range of 1 millimeters (mm) to 6 millimeters. In some embodiments, the particulate glass is an amount in the range of 0.25 weight of the total weight (w/w %) to 2.0 w/w %. In some embodiments, the carrier fluid is an aqueous carrier fluid that includes at least one of diutan gum, xanthan gum, and welan gum. In some embodiments, the Portland cement clinker includes ASTM International Type I cement clinker, ASTM International Type V cement clinker, API Class A cement clinker, or API Class G cement clinker. In some embodiments, the LCM composition includes cement. In some embodiments, the cement includes API Class G cement. In some embodiments, the weight ratio of cement clinker to cement is in the range of 60:40 to 90:10. In some embodiments, the method includes maintaining the LCM in contact with the lost circulation zone for a time period, such that the LCM forms a plug. In some embodiments, the time period is in the range of 24 hours to 76 hours. In some embodiments, the lost circulation zone is located in a karst formation. In some embodiments, introducing the lost circulation material (LCM) into the wellbore includes mixing the LCM with water to form a mixture and pumping the mixture into the lost circulation zone.

In another embodiment, an LCM composition is provided that includes Portland cement clinker and a carrier fluid. In some embodiments, the carrier fluid is an aqueous carrier fluid that includes at least one of diutan gum, xanthan gum, and welan gum. In some embodiments, the carrier fluid us a drilling fluid. In some embodiments, the carrier fluid is a non-aqueous fluid. In some embodiments, the carrier fluid is an aqueous drilling fluid. In some embodiments, the Portland cement clinker includes ASTM International Type I cement clinker, ASTM International Type V cement clinker, API Class A cement clinker, or API Class G cement clinker. In some embodiments, the weight ratio of carrier fluid to clinker is 1:1. In some embodiments, the LCM composition includes a plurality of polymer fibers. In some embodiments, the polymer fibers include polypropylene fibers. In some embodiments, the LCM composition includes particulate glass having an aspect ratio greater than or less than 1. In some embodiments, the particulate glass includes a plurality of glass fibers or a plurality of glass flakes.

In another embodiment, a method to control lost circulation in a lost circulation zone in a wellbore is provided that includes introducing a lost circulation material (LCM) into the wellbore such that the LCM contacts the lost circulation zone and reduces a rate of lost circulation into the lost circulation zone as compared to a period before introducing the LCM. The LCM includes Portland cement clinker and a carrier fluid. In some embodiments, the carrier fluid is an aqueous carrier fluid that includes at least one of diutan gum, xanthan gum, and welan gum. In some embodiments, the carrier fluid us a drilling fluid. In some embodiments, the carrier fluid is a non-aqueous fluid. In some embodiments, the carrier fluid is an aqueous drilling fluid. In some embodiments, the Portland cement clinker includes ASTM International Type I cement clinker, ASTM International Type V cement clinker, API Class A cement clinker, or API Class G cement clinker. In some embodiments, the weight ratio of carrier fluid to clinker is 1:1. In some embodiments, the LCM composition includes a plurality of polymer fibers. In some embodiments, the polymer fibers include polypropylene fibers. In some embodiments, the LCM composition includes particulate glass having an aspect ratio greater than or less than 1. In some embodiments, the particulate glass includes a plurality of glass fibers or a plurality of glass flakes.

In another embodiment, an LCM composition is provided that includes Portland cement clinker, cement, and a carrier fluid. In some embodiments, the carrier fluid is an aqueous carrier fluid that includes at least one of diutan gum, xanthan gum, and welan gum. In some embodiments, the Portland cement clinker includes ASTM International Type I cement clinker, ASTM International Type V cement clinker, API Class A cement clinker, or API Class G cement clinker. In some embodiments, the cement is API Class G cement. In some embodiments, the weight ratio of carrier fluid to cement clinker is 1:1. In some embodiments, the weight ratio of cement clinker to cement is in the range of 60:40 to 90:10. In some embodiments, the LCM composition includes a plurality of polymer fibers. In some embodiments, the polymer fibers include polypropylene fibers. In some embodiments, the LCM composition includes particulate glass having an aspect ratio greater than or less than 1. In some embodiments, the particulate glass includes a plurality of glass fibers or a plurality of glass flakes.

In another embodiment, a method to control lost circulation in a lost circulation zone in a wellbore is provided that includes introducing a lost circulation material (LCM) into the wellbore such that the LCM contacts the lost circulation zone and reduces a rate of lost circulation into the lost circulation zone as compared to a period before introducing the LCM. The LCM includes Portland cement clinker, cement, and a carrier fluid. In some embodiments, the carrier fluid is an aqueous carrier fluid that includes at least one of diutan gum, xanthan gum, and welan gum. In some embodiments, the Portland cement clinker includes ASTM International Type I cement clinker, ASTM International Type V cement clinker, API Class A cement clinker, or API Class G cement clinker. In some embodiments, the cement is API Class G cement. In some embodiments, the weight ratio of carrier fluid to cement clinker is 1:1. In some embodiments, the weight ratio of cement clinker to cement is in the range of 60:40 to 90:10. In some embodiments, the LCM composition includes a plurality of polymer fibers. In some embodiments, the polymer fibers include polypropylene fibers. In some embodiments, the LCM composition includes particulate glass having an aspect ratio greater than or less than 1. In some embodiments, the particulate glass includes a plurality of glass fibers or a plurality of glass flakes.

DETAILED DESCRIPTION

Figure 1:
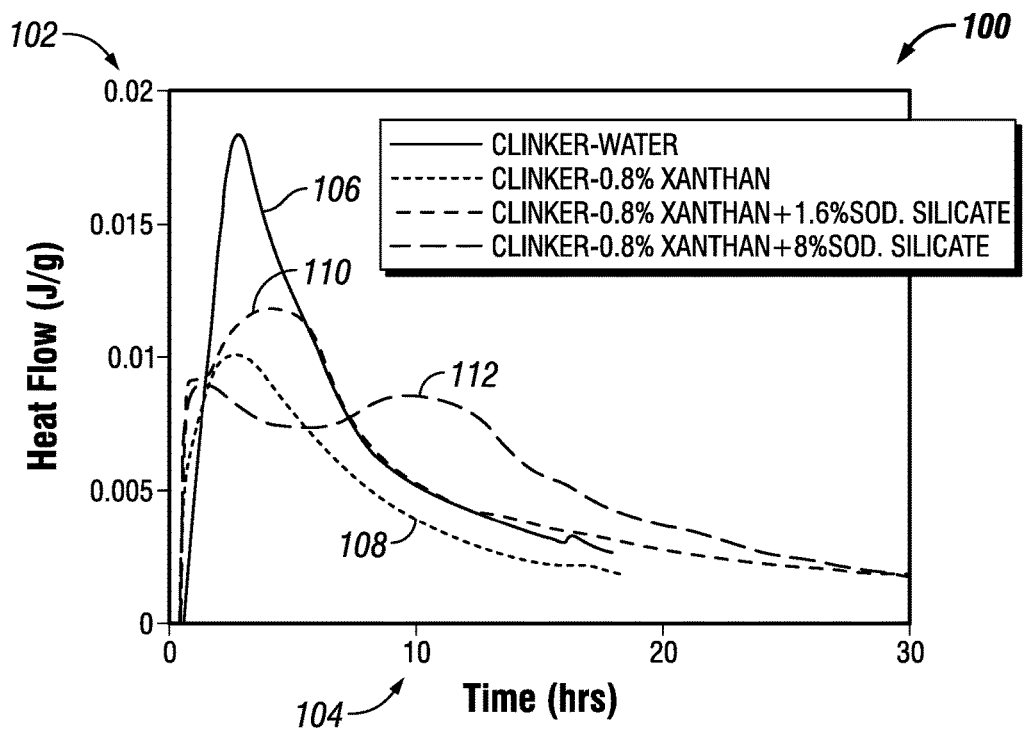
FIG. 1 is a plot of the heat of hydration of Portland cement clinker and xanthan gum compositions with and without sodium silicate in accordance with embodiments of the disclosure.

The present disclosure will now be described more fully with reference to the accompanying drawings, which illustrate embodiments of the disclosure. This disclosure may, however, be embodied in many different forms and should not be construed as limited to the illustrated embodiments. Rather, these embodiments are provided so that this disclosure will be thorough and complete, and will fully convey the scope of the disclosure to those skilled in the art.

As used herein, the term "cement clinker" or "Portland cement clinker" refers to a substance distinct from cement and formed during the manufacture of Portland cement during the cement kiln stage. As used herein, "cement clinker" or "Portland cement clinker" refers to non-hydraulic, non-cementiceous unground Portland cement clinker particles. As used herein, "cement clinker" or "Portland cement clinker" does not include conventional cement that is ground up to promote its reactivity with water to form set cement.

Embodiments of the disclosure include Portland cement clinker LCMs that include Portland cement clinker to mitigate or prevent lost circulation in a well, and thus minimize or prevent fluid loss in, for example, vugular formations. The Portland cement clinker may include clinker of ASTM International Type I cement clinker, ASTM International Type V cement clinker, API Class A, and API Class G cement clinker. In some embodiments, the cement clinker LCM may also include cement, such as API Class G cement. In some embodiments, the cement clinker composition includes a carrier fluid, such as xanthan gum. In other embodiments, the carrier fluid may be diutan gum or welan gum. Advantageously, the different particle sizes of the clinker used in the cement clinker LCM compositions can pack together to form tightly packed plugs of relatively low permeability. Moreover, even partial setting of the clinker or cement used in the cement clinker composition can decrease the permeability of the formed plugs and further improve the mitigation or prevention of loss of wellbore fluids in lost circulation zones. Furthermore, additional advantage includes the provisions for the use of one or more selected sizes of the clinker to the exclusion of other sizes as LCM materials in wellbore fluids such as aqueous or non-aqueous drilling fluids or cement slurries.

Embodiments of the disclosure include a cement clinker LCM composition having the cement clinker, the cement, the aqueous carrier fluid, and an inorganic consolidation agent. The inorganic consolidation activator may be a silicate salt such as sodium silicate. In some embodiments, the inorganic consolidation activator may include, by way of example, calcium aluminate, calcium chloride, sodium aluminate, and potassium silicate. In some embodiments, the LCM composition may include combinations of inorganic consolidation activators, such as sodium aluminate and potassium silicate. The LCM composition may include the inorganic consolidation activator in an amount in the range of about 1.0 w/w % to about 3.0 w/w % by weight of the solids.

Embodiments of the disclosure also include a cement clinker LCM composition having the cement clinker and a crosslinked aqueous fluid as the carrier fluid. In some embodiments, the cross linked fluid is a polyuronide such as an alginate or a pectinate. In such embodiments, the crosslinking fluid is crosslinked by calcium ions leached or released from the clinker when mixed with the polyuronide. In some embodiments, the crosslinked fluid is apple pectin, citrus pectin, or sodium alginate. In some embodiments, the crosslinked fluid is a biopolymer crosslinked with divinyl sulfone (DVS). The biopolymer may include xanthan gum, hydroxyethyl cellulose, diutan gum welan gum, and guar gum, or combinations thereof. For example, in some embodiments the crosslinking fluid may be a combination of xanthan gum and guar. In some embodiments, the LCM composition includes a weight ratio of biopolymer to DVS in the range of about 1:1 to 1:0.5. In some embodiments, the LCM composition having a biopolymer aqueous crosslinking fluid containing DVS may include a base such as sodium hydroxide (NaOH) in an amount sufficient to adjust the pH of the aqueous composition to about 8.5 or greater, and the aqueous composition may be heated to at least 150° F. until the viscosity begins to increase prior to the addition of clinker. Advantageously, the crosslinked fluids are suitable for effectively suspending relatively larger clinker particles (e.g., greater than 1 cm) having a low surface and that are significantly heavier than the crosslinked fluids. For example, such LCM compositions having a crosslinked fluid may be used with cement clinker having relatively larger particles, such as clinker with particles having diameter greater than 1 cm, greater than 2 cm, greater than 3 cm, or a combination thereof.

Embodiments of the disclosure further include a cement clinker LCM composition having the cement clinker, an aqueous carrier fluid, and polymer fibers or particulate glass having an aspect ratio greater or less than 1. A particle is said to an "aspect ratio greater or less than 1" if the dimensions of the particle in one direction (for example, length) are different than those from another direction (for example, width or radius). The polymer fibers may include polypropylene fibers or polyacrylonitrile fibers. In some embodiments, LCM composition may include polymer fibers in an amount in the range of 0.25 w/w % to about 1.0 w/w %. In some embodiments, the polymer fibers have a length in the range of about 1 mm to about 6 mm. In such embodiments, the LCM composition may include particulate glass with an aspect ratio. In some embodiments, the particulate glass may include glass fibers. The length of glass fibers may be in the range of about 1 mm to about 6 mm. Alternatively, in some embodiments the glass fibers may be a milled type with a wider distribution of lengths. The glass fibers may be Alkali Resistant type, or E-glass type in chemical composition. In some embodiments, the particulate glass is of a flake type with varying areas and thickness. The amount of particulate glass used may be in an amount in the range of about 0.25 w/w % to about 2.0 w/w % of the total composition.

The cement clinker LCMs described herein may be mixed with a fluid (for example, water) and introduced into a lost circulation zone in a well. In some embodiments, after introduction of cement clinker LCM into a lost circulation zone, the cement clinker LCM may be maintained in contact with the lost circulation zone for a time period such that the LCM forms plugs in the fractures, gaps, vugs, and other spaces in the lost circulation zone. In some embodiments, the time period may be about 24 hours to about 72 hours. In some embodiments, the size (for example, diameter) of the cement clinker particles used in a cement clinker LCM may be selected based on the type of formation having the lost circulation zone. For example, cement clinker that includes particles having diameters of 3 centimeters (cm) or greater may be selected for lost circulation zones having relatively large fractures and vugs or small caverns. Alternatively, sized clinker particles with well-defined diameters can be employed either by themselves or in combination with other sized clinker particles. For example, clinker particles that passed through a US #8 mesh but were retained by #16 mesh can be used by themselves or in combination with another similarly produced sized clinker using different combination of sieves. Such sized clinker particles can be added to a wellbore treatment fluid such as a water-based or non-aqueous drilling fluid or a cement slurry to stop circulation losses.

Example Portland Cement Clinker LCM Compositions Using a Carrier Fluid and an Inorganic Consolidation Activator The following examples are included to demonstrate embodiments of the disclosure. It should be appreciated by those of skill in the art that the techniques and compositions disclosed in the example which follows represents techniques and compositions discovered to function well in the practice of the disclosure, and thus can be considered to constitute modes for its practice. However, those of skill in the art should, in light of the present disclosure, appreciate that many changes can be made in the specific embodiments which are disclosed and still obtain a like or a similar result without departing from the spirit and scope of the disclosure.

Example LCM compositions were prepared using different Portland cement clinkers and inorganic consolidation activators. As will be appreciated, the Portland cement clinkers were identified by the cement types designated using ASTM C150/C150M-12, Standard Specification for Portland Cement, ASTM International, West Conshohocken, Pa., 2012, and API Spec. 10A, Specification for Cements and Materials for Well Cementing, 23rd edition. 2002. Washington, D.C.: API. Five Portland cement clinkers were obtained from the following cement types: ASTM International Type I obtained from Texas Lehigh Cement Company, LP, of Buda, Tex. USA, ASTM International Type I from a cement factory, API Class A obtained from LaFarge Corporation of Chicago, Ill., USA, and ASTM International Type V and API Class G obtained from a cement factory. The Portland cement clinkers were subjected to sieve separation, and the samples passing through a No. 4 mesh sieve were collected for additional testing. The sieve analysis of the four Portland cement clinkers is shown in Table 1:

TABLE 1

SIEVE ANALYSIS OF PORTLAND CEMENT CLINKERS

| Mesh # (Particles Retained by) | Wt % in the total mass | | | |
|---|---|---|---|---|
| | ASTM Type I (Source 1) | ASTM Type I (Source 2) | ASTM Type V | API Class G |
| # 8 mesh | 22 | 27 | 23 | 18 |
| # 16 mesh | 21 | 25 | 15 | 16 |
| Final sample | 57 | 48 | 62 | 66 |

The material that passed through the #4 mesh sieve for each clinker was used in further testing. The sieve analysis of mixtures of clinker material and ground API Class G cement in a weight ratio of 70:30 typically used in well cementing is shown in Table 2:

TABLE 2

SIEVE ANALYSIS OF PORTLAND CEMENT CLINKERS AND CLASS G CEMENT MIXTURES IN 7:3 WEIGHT RATIOS

| Screen # (Particles Retained by) | Wt % in the total mass (Clinker Passing through #4 mesh:API Class G ground cement = 70:30) | | | |
|---|---|---|---|---|
| | ASTM Type I (Vendor 1) | ASTM Type I (Vendor 2) | ASTM Type V | API Class G |
| # 8 mesh | 15 | 27 | 17 | 13 |
| # 16 mesh | 15 | 18 | 11 | 12 |
| Final sample | 70 | 55 | 72 | 75 |

Three different polymers were evaluated for their ability to act suspending aids (also referred to as "suspending agents") in water to form the carrier fluid and suspend clinker particles at room temperature: diutan gum, xanthan gum, and welan gum. In a typical procedure, the polymer is slowly tapped into stirred water. The agitation rate was kept low (less than 500 revolutions per minute) during a dissolution period of about 30 to about 45 minutes. The weight ratio of the carrier fluid to cement solids was maintained at 1:1. The diutan gum, xanthan gum, and welan gum were each tested at concentrations of about 0.5 wt % to about 0.8 wt %. Xanthan gum was found to be most suitable of the three polymers for providing the particle suspension at room temperature. Accordingly, subsequent experiments were conducted using various aqueous xanthan solutions: a 0.3 wt % xanthan gum solution, a 0.6 wt % xanthan gum solution, and a 0.8 wt % xanthan gum solutions to form the carrier fluid for suspending clinker particles of different sizes. As described below, various hydration measurements were conducted. The cement hydration measurements on sieved clinker materials were performed using differential scanning calorimetry (DSC).

Different inorganic compounds were tested for their ability to consolidate the clinker slurry. The tested compounds include the following inorganic solids salts and solutions: sodium carbonate, potassium silicate solid, sodium silicate solutions and solids with different sodium hydroxide to silica ratios, sodium aluminate, sodium hexametaphosphate, calcium chloride, sodium chloride, aluminum sulfate, sodium sulfate, and calcium nitrite.

The testing was conducted using blends of sieved Type I Portland cement clinker and cement kiln dust in various weight ratios and in a 0.8% xanthan gum solution as the carrier fluid. The cement kiln dust was found to be less effective than Class G cement in providing particle consolidation upon curing. Silica flour was also found to be less effective than cement kiln dust in its consolidation ability.

Example LCM compositions were formed from different weight ratios of each type of Portland cement clinker (ASTM International Type I from a first source, (ASTM International Type I from a second source, ASTM International Type V, and API Class G) and API Class G cement in a 0.8% xanthan gum solution as the suspending medium. The free water separating during the curing process was determined from the weight of a cured cement plug as compared to the total slurry weight. The difference in weight after curing was used as the free water that separated during the curing process.

For each example composition, the free water separated during curing was determined and the state of the plug was evaluated. The results from the testing are shown in Table 3:

TABLE 3

CURING RESULTS FOR PORTLAND CEMENT CLINKER AND API CLASS G CEMENT COMPOSITIONS

| Clinker Type | Clinker:Class G Weight ratio | Free Water (%) | Plug Evaluation |
|---|---|---|---|
| Type I (Source 1) | 90:10 | 10 | Not set, too soft |
| Type I (Source 1) | 80:20 | 10 | Soft |
| Type I (Source 1) | 70:30 | 10 | Rubbery soft |
| Type I (Source 1) | 60:40 | 7 | Firm with some strength |
| Type I (Source 2) | 80:20 | None | Soft |
| Type V | 80:20 | 16 | Soft |
| Class G | 70:30 | 0 | Soft |
| Class G | 60:40 | 10 | Firm |

Initial testing was performed using combinations of different particle size cement clinker fractions in 0.3 wt % diutan gum solutions as the carrier fluid and sodium silicate. The tests indicated that sodium silicate by itself or in combination with soluble carbonate salts provided for consolidation of cement particles when cured at elevated temperatures.

FIG. 1 is a plot 100 of the heat of hydration of cement clinker (that is, the fraction of the cement clinker that passed through a US #4 mesh screen) and xanthan gum solution compositions with sodium silicate as compared to a control composition without sodium silicate. As shown in FIG. 1, the y-axis 102 corresponds to the heat flow in joules/gram (J/g) and the x-axis 104 corresponds to the time in hours. The plot 100 depicts the heat of hydration for the following compositions: a clinker-water composition (depicted by line 106), a clinker and xanthan gum solution (depicted by line 108), a clinker and xanthan gum solution with 1.6 w/w % sodium silicate (depicted by line 110), and a clinker and xanthan gum solution with 0.8 w/w % sodium silicate (depicted by line 112). FIG. 1 shows the evolution of the heat of hydration over longer periods of hydration as compared to the control sample without sodium silicate.

Various inorganic consolidation activators were tested using the different Portland cement clinkers and API Class G cement compositions in xanthan gum solutions. The ASTM International Type I (first source), (ASTM International Type I (second source), and ASTM International Type V Portland cement clinker compositions were prepared using a 0.8% xanthan gum solution, and the API Class G Portland cement clinker compositions were prepared using a 0.6% xanthan gum solutions. Two of the ASTM International Type I Portland cement clinker compositions also included polypropylene fibers having a length of 3 millimeters (3 mm).

Each example composition was cured for about 3 days at a temperature of about 180° F. The free water separated during curing was determined and the state of the plug was evaluated. The results from the testing are shown in Table 4:

TABLE 4

CURING RESULTS FOR PORTLAND CEMENT CLINKER AND API CLASS G CEMENT COMPOSITIONS USING VARIOUS INORGANIC CONSOLIDATION ACTIVATORS

| Clinker Type | Clinker: Class G cement weight ratio | Consolidation Agent (% by wt of cement) | Free Water (%) | Plug Evaluation |
|---|---|---|---|---|
| Class G | 60:40 | Calcium aluminate (1%) | 0 | Soft |
| Class G | 60:40 | Calcium chloride (1%) | 10 | Firm |
| Class G | 60:40 | Sodium aluminate (1%) | 6 | Firm |
| Class G | 60:40 | Potassium silicate (1%) | 6 | Firm |
| Class G | 60:40 | Sodium aluminate (1%) + Potassium silicate (1%) | 0 | Firm |
| Class G | 60:40 | Sodium aluminate (0.5%) + Potassium silicate (0.5%) | 4 | Firm |
| Class G | 60:40 | Sodium aluminate (0.75%) + Potassium silicate (0.25%) | 5 | Firm |
| Class G | 60:40 | Sodium aluminate (0.25%) + Potassium silicate (0.75%) | 0 | Firm |
| Type I | 60:40 | None | 9 | Intact, not firm |
| Type I | 60:40 | Sodium aluminate (1.2%) | 5 | Firm |
| Type I | 60:40 | Potassium silicate (1.2%) | 2 | Firm |
| Type I | 60:40 | Sodium aluminate (1.2%) + Potassium silicate (1.2%) | 1 | Firm, poor integrity |
| Type I | 60:40 | Polypropylene Fiber-3 mm- (0.5%) (added to mix water) | 14 | Intact, Firm |
| Type I | 60:40 | Sodium aluminate (1.2%) + Potassium silicate (1.2%) + Polypropylene Fiber-3 mm- (0.5%) (added to mix water) | 1 | Intact, Firm cylinder |
| Type V | 70:30 | None | 12 | Not set, crumbly |
| Type V | 70:30 | Sodium aluminate (1.3%) + Potassium silicate (1.2%) | 3 | Firm plug |
| Type V | 60:40 | None | 13 | Not set, crumbly |
| Type V | 60:40 | Sodium aluminate (1.3%) + Potassium silicate (1.2%) | 3 | Very firm, some strength |
| Class G | 70:30 | Sodium aluminate (1.0%) + Potassium silicate (1.0%) | 0 | Not set, fell apart |
| Class G | 60:40 | Sodium aluminate (1.0%) + Potassium silicate (1.0%) | 3 | Not set, fell apart |

Table 4: Curing Results for Portland Cement Clinker and API Class G Cement Compositions Using Various Inorganic Consolidation Activators As shown in Table 4, various inorganic consolidation activators, when used with suitable Portland cement clinker and Portland cement compositions, may enable the formation of settable fluid flow-blocking plugs that may be used to mitigate or prevent lost circulation in a lost circulation zone.

Example Portland Cement Clinker Compositions Using Crosslinked Polysaccharides

Example LCM compositions were prepared using API Class A Portland cement clinkers and crosslinked polysaccharides. The API Class A Portland cement clinker was subjected to sieve separation. The sieve analysis is shown in Table 5:

TABLE 5

SIEVE ANALYSIS OF PORTLAND CEMENT CLINKER

| Screen # (Particles Passed Through) | Screen # (Particles Retained by) | % Particles in the total mass |
|---|---|---|
| — | 7/16" | 16 |
| 7/16" | # 4 mesh | 19 |
| #4 mesh | # 8 mesh | 19 |
| # 8 mesh | # 16 mesh | 16 |
| #16 mesh | Final sample | 30 |

The bulk of the API Class A Portland cement clinker was sieved using a #4 mesh screen, and the clinker material that passed through the screen was collected and used for the testing described in this section. Additional Portland cement clinker types were also sieved using a #4 mesh screen, collected and used, for the testing described in this section. The additional Portland cement clinkers were obtained from the following cement types: ASTM International Type I, ASTM International Type V, and API Class G.

As discussed above, three different polymers were evaluated for their ability to act suspending aids when dissolved in water to form a carrier fluid and suspend clinker particles at room temperature: diutan gum, xanthan gum, and welan gum. The weight ratio of the carrier fluid to cement solids was maintained at 1:1. The diutan gum, xanthan gum, and welan gum were each tested at concentrations of about 0.5% to about 0.8%. Xanthan gum was found to be the most suitable of the three polymers for providing the particle suspension at room temperature. Accordingly, subsequent experiments were conducted using a 0.3% xanthan gum solution, a 0.6% xanthan gum solution, and a 0.8% xanthan gum solution as the carrier fluid for suspending clinker particles of different sizes.

Example Portland cement clinker compositions were prepared using two different types of crosslinking fluids. Biopolymers, such as xanthan gum, hydroxyethyl cellulose, diutan gum, welan gum, and guar solutions were crosslinked using divinyl sulfone (DVS). The solutions were crosslinked by heating alkaline solutions of the polymers at about 180° F. and monitoring the viscosities using Brookfield viscometers. The pH of each solution was adjusted to at least 8.5 using a 2% NaOH solution. A 0.8% xanthan gum solution was used and the weight ratio of xanthan gum to DVS was varied from 1:1 to 0.5. A 0.5% diutan gum solution was used, and the weight ratio of diutan to DVS was varied from 1:1 to 1:0.5. The remaining gum concentrations and DVS ratios were similar to the diutan gum solution and ratios. After testing, the xanthan gum, welan gum, and diutan gum solutions were found to be less susceptible to crosslinking with DVS than the random coiled and non-helical polymers such as guar and hydroxyethyl cellulose.

Testing was conducted using clinker particles of relatively larger sizes. However, when larger clinker particles—clinker particles that passed the 7/16 inch screen but were retained on the No. 4 mesh screen—were added to the xanthan gum solutions, they settled to the bottom. These particles had diameters in the range of about 0.25 inches (0.6 cm) to about 0.58 inches (1.45 cm). The example Portland cement clinkers also had particles larger than this range retained on the 7/16 inch screen. An example Portland cement clinker composition was prepared using a mixture of helical and random coil polysaccharide polymers crosslinking with DVS, such that one polymer is crosslinked and the other polymer retains its mobility while moving within the crosslinked network. Such compositions provide the flexibility of crosslinked fluids viscous enough to suspend large clinker particles (for example, particles that passed through the 7/16 inch screen but were retained by the No. 4 mesh sieve) and form a flowable gel. The particles remain suspended in the composition without settling in the guar/xanthan mixture under static conditions for more than a month.

Figure 2:
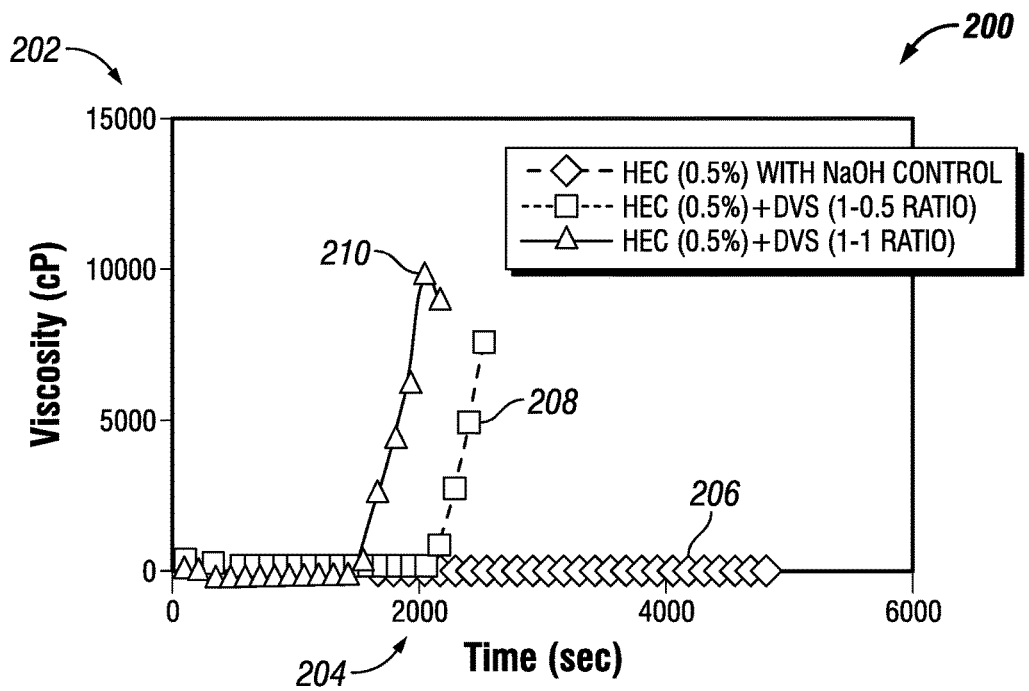
FIG. 2 a plot of viscosity measurements on the carrier fluid having hydroxyethyl cellulose and divinyl sulfone (DVS) as a crosslinking fluid used in various Portland cement clinker compositions in accordance with embodiments of the disclosure.

FIG. 2 is a plot 200 of the viscosity measurements of various hydroxyethyl cellulose compositions illustrating the use of DVS as a crosslinking fluid. As shown in FIG. 2, the y-axis 202 corresponds to the viscosity in centipoise (cP) and the x-axis 204 corresponds to the time in seconds (sec). The plot 200 in FIG. 2 illustrates the viscosity vs. time for the following compositions heated to about 180° F.: a hydroxyethyl cellulose control composition formed from a 0.5% hydroxyethyl cellulose solution and NaOH (depicted by line 206), a hydroxyethyl cellulose composition formed from a 0.5% hydroxyethyl cellulose solution and DVS in a 1:0.5 weight ratio ((depicted by line 306), and a hydroxyethyl cellulose composition formed from a 0.5% hydroxyethyl cellulose solution and DVS in a 1:1 weight ratio (depicted by line 308). FIG. 2 depicts the increased viscosity resulting from the crosslinking of hydroxyethyl cellulose facilitated by the DVS, showing the suitability as a carrier fluid for the clinker for use as an LCM.

Figure 3:
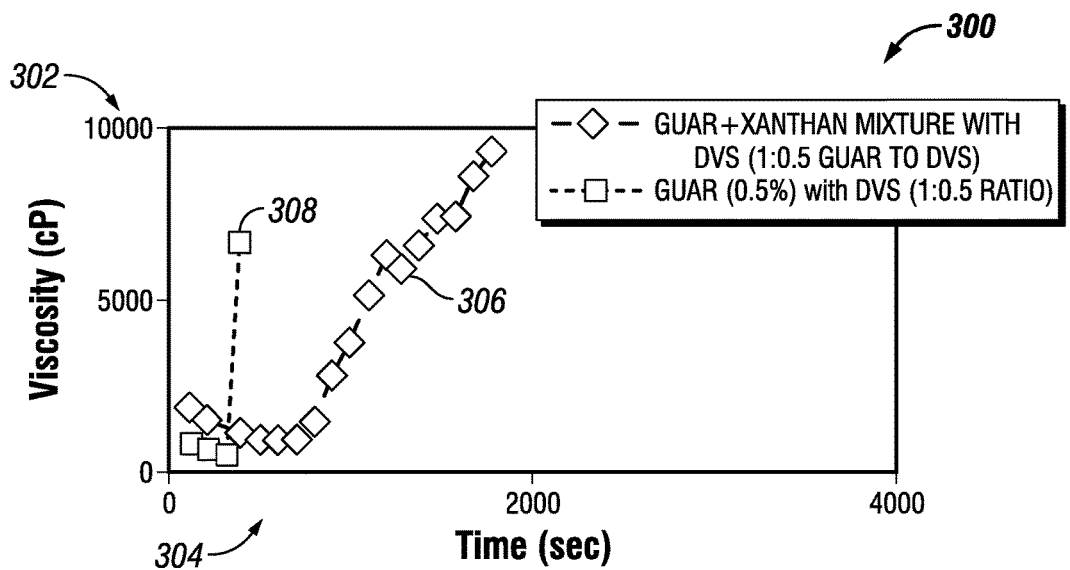
FIG. 3 is a plot of viscosity measurements on the carrier fluid having guar gum and xanthan gum with DVS as a crosslinking fluid used in various Portland cement clinker compositions in accordance with embodiments of the disclosure.

FIG. 3 is a plot 300 of viscosity measurements of various guar gum and xanthan gum compositions illustrating the use of DVS as a crosslinker to form the carrier fluid. As shown in FIG. 3, the y-axis 302 corresponds to the viscosity in centipoise (cP) and the x-axis 304 corresponds to the time in seconds (sec). The plot 300 in FIG. 3 illustrates the viscosity vs. time for a guar gum and xanthan gum composition formed from a 0.5% guar gum solution, xanthan gum, and DVS and having a weight ratio of guar gum to DVS of 1:0.5 (depicted by line 306). The plot 300 in FIG. 3 also depicts a guar gum and xanthan gum composition formed from a 0.5% guar solution and DVS and having a weight ratio of guar to DVS of 1:0.5 (depicted by line 308). FIG. 3 depicts the different viscosity characteristics resulting from a mixture of helical and random coil polysaccharides with the DVS crosslinker as compared to a composition only having a random non-helical polysaccharide, thus showing the suitability as a carrier fluid for the clinker having larger clinker particles.

Additionally, example Portland cement clinker compositions were prepared using a polyuronide carrier fluid. Example Portland cement clinker compositions were formed using apple pectin at a concentration of 1.5% and citrus pectin at a concentration of 1.5%. A third example Portland cement clinker composition was formed using commercially available sodium alginate. The compositions formed highly thixotropic, non-settling slurries at room temperature. The compositions were stored at about 180° F., causing syneresis of the fluid with the formation of free water. Both the example alginate and the pectins formed gels in the presence of calcium ions present upon dissolution of a small amount of clinker. The calcium ions dissolved from the clinker enable the formation of "egg-crate" calcium complexes with the example alginate or pectins, showing the suitability as a carrier fluid for the clinker for use as an LCM. Such compositions thus are also suitable of suspension of clinker for use as an LCM, especially as a carrier fluid for clinker having larger clinker particles.

Example Portland Cement Clinker Compositions Using High Aspect Ratio Material

Example LCM compositions were prepared using API Class A Portland cement clinkers and high aspect ratio materials. The API Class A Portland cement clinker was subjected to sieve separation. The sieve analysis is shown in Table 6:

TABLE 6

SIEVE ANALYSIS OF PORTLAND CEMENT CLINKER

| Screen # (Particles Passed Through) | Screen # (Particles Retained by) | % Particles in the total mass |
|---|---|---|
| — | 7/16" | 16 |
| 7/16" | # 4 mesh | 19 |
| #4 mesh | # 8 mesh | 19 |
| # 8 mesh | # 16 mesh | 16 |
| #16 mesh | Final sample | 30 |

The bulk of the API Class A Portland cement clinker was sieved using a #4 mesh screen, and the clinker material that passed through the screen was collected and used for the testing described in this section. Additional Portland cement clinker types were also sieved using a #4 mesh screen, collected and used, for the testing described in this section. The additional Portland cement clinkers were obtained from the following cement types: ASTM International Type I, ASTM International Type V, and API Class G.

As discussed above, three different polymers were evaluated for their ability to act as suspending aids when dissolved in water to from the carrier fluid and suspend clinker particles at room temperature: diutan gum, xanthan gum, and welan gum. The weight ratio of the carrier fluid to cement solids was maintained at 1:1. The diutan gum, xanthan gum, and welan gum were each tested at concentrations of about 0.5% to about 0.8%. Xanthan gum was found to be the most suitable of the three polymers for providing the particle suspension at room temperature. Accordingly, subsequent experiments were conducted using a 0.6% xanthan gum solution and a 0.8% xanthan gum solution as the carrier fluid for suspending clinker particles of different sizes.

As described below, various hydration measurements were conducted. The cement hydration measurements on sieved clinker materials were performed using differential scanning calorimetry (DSC) at 25° C. and 70° C.

Loss circulation measurements were performed using a kitchen dough extruder having a hand-squeezable piston, such as an extruder used to squeeze and extrude dough into strands. Discs having different hole dimensions and geometries, including circular holes of different diameters and slits of different widths, were used to simulate loss circulation geometries. An example cement clinker compositions suspended in 0.8% xanthan gum solution was prepared by mixing a 1:1 weight ratio of clinker to xanthan gum solution. The paste was transferred to the testing apparatus with the preassembled lid containing the piston, and the bottom lid containing the disc with the desired hole dimensions and geometries was attached. A Teflon tape was used to the cover the threads on the outside of the main cylinder of the testing apparatus to provide a leak-proof seal. Pressure was applied by hand-squeezing the piston until the flow of filtrate exiting the testing apparatus stopped. The weight of the filtrate was measured. The testing apparatus was dissembled, and the filter cake was removed.

The strength of the filter cake material was measured by packing the cake into a cell of an Ultrasonic Cement Analyzer (UCA) manufactured by the Chandler Equipment Company of Springdale, Ariz., USA, and the strength development was monitored at a test temperature. When the strengths leveled off, the measurement was stopped.

The example cement clinker compositions were also optimized for particle size distribution for development of structural integrity upon placement. The structural integrity was determined by curing the cement slurry at 180° F. in the range of about 2 days to about 3 days and visually inspecting the formed plug. The compositions were optimized by blending cement clinker with a ground oil well cement (API Class G cement) in different clinker to ground cement ratios. The plugs formed by the example compositions was compared to the plug integrity of the plug formed from a composition of 100% clinker. The comparison was performed by determining the ease by which the set plug demolded as an intact cylinder from a 1.5 inch (diameter)×9 inch (length) cylindrical bass mold, and by the plug integrity and the strength to touch of the demolded plugs. The molds were cured in a water bath at about 180° F. for about 48 hours to about 72 hours.

Figure 4:
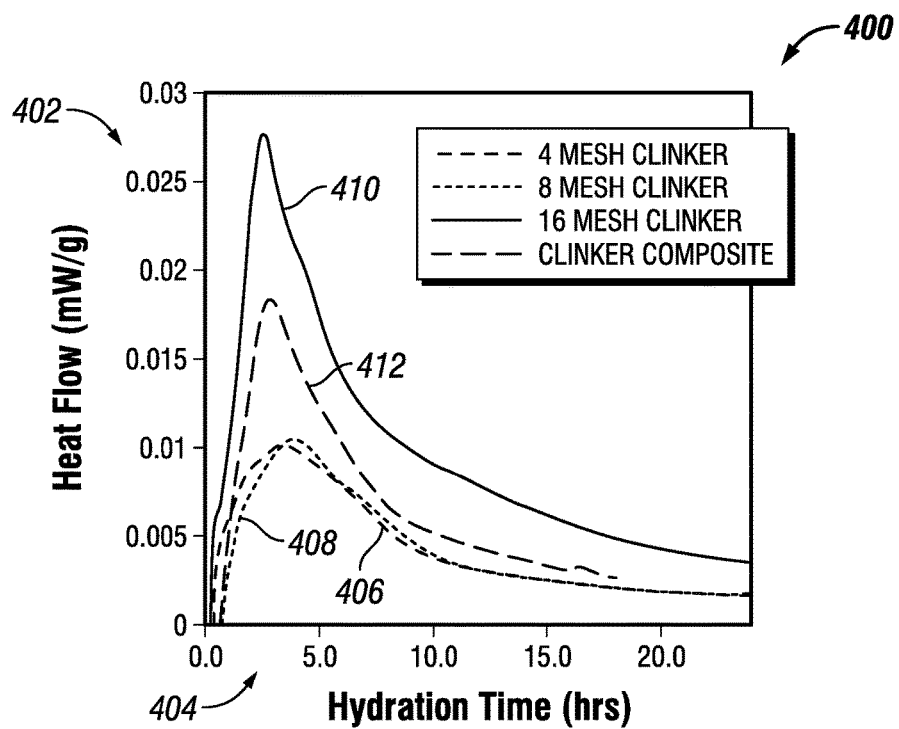
FIG. 4 is a plot of the heat of hydration of Portland cement clinker compositions having different particle sizes of ASTM Type I cement clinker in accordance with embodiments of the disclosure.

FIG. 4 is a plot 400 of the heat of hydration of different clinker compositions having different particle sizes of ASTM Type I cement clinker. As shown in FIG. 4, the y-axis 402 corresponds to the heat flow in milliwatt/gram (mW/g) and the x-axis 404 corresponds to the time in hours. The plot 400 depicts the heat of hydration for the following compositions: a clinker composition having No. 4 mesh retained particles (depicted by line 406), a clinker composition having No. 8 mesh retained particles (depicted by line 408), a clinker composition having No. 16 mesh retained particles (depicted by line 410), and the composite of the clinker particles that passed the No. 16 mesh.

Figure 5:
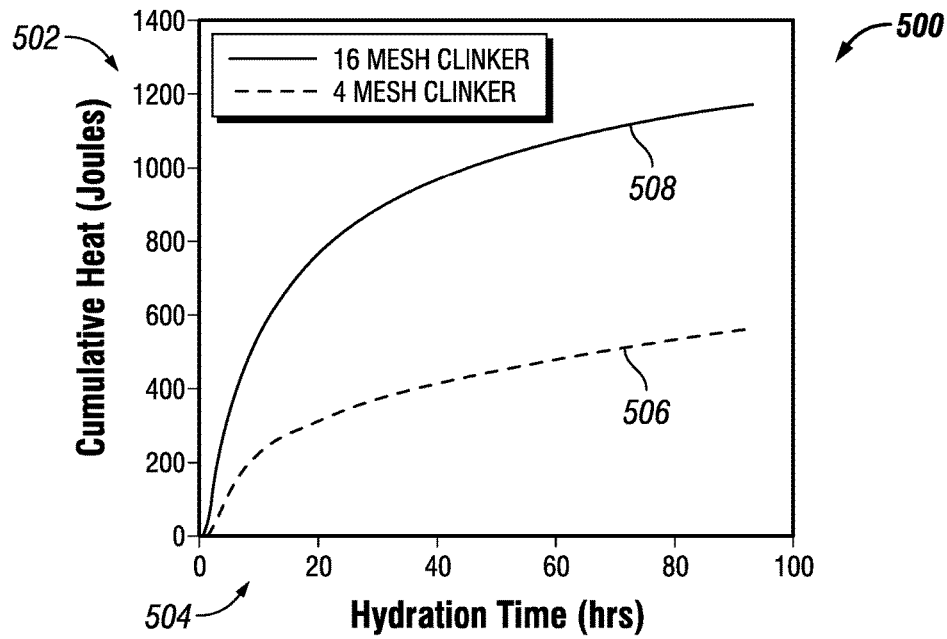
FIG. 5 is a plot of the cumulative heat of hydration of Portland cement clinker compositions having two clinker particle sizes of ASTM Type I cement clinker in accordance with embodiments of the disclosure.

FIG. 5 is a plot 500 of the cumulative heat of hydration of two clinker particle sizes of ASTM Type I Cement. As shown in FIG. 5, the y-axis 502 corresponds to the cumulative heat of hydration in joules (J) and the x-axis 504 corresponds to the hydration time in hours. The plot 500 depicts the heat of hydration for a clinker composition having No. 4 mesh retained particles (depicted by line 506) and a clinker composition having No. 16 mesh retained particles (depicted by line 508), The heat of hydrations shown in FIGS. 4 and 5 are consistent with the expected relationship between particle sizes, surface areas, and reactivity with water. That is, smaller particles hydrated and generated more heat than larger particles. The heat generated due to the hydration is an indicator of subsequent strength development. The results show that by controlling the amount of fine cement particle content, the strength of the cement plug can be controlled.

Various example Portland cement clinker compositions were prepared with and without fibers or flakes using a 0.8% xanthan gum solution. In the example compositions that included high aspect ratio materials such as different fibers or flake materials, the materials were dry blended into the cement or pre-dispersed into the mixing fluid. The glass flakes were of thickness in the range of about 6.5 μm to about 8.5 μm with 80% or more particles in the range of about 150 μm to about 1700 μm.

The weight of the filter cakes and the weight of the filtrate for each example composition were measured. In some embodiments, the compositions were prepared using RadiLock fibers available from Bossco Industries of Houston, Tex., USA. Table 7 depicts the results of for each example Portland cement clinker composition with or without fibers and screen type

TABLE 7

RESULTS OF FILTER CAKE FORMATION FOR EXAMPLE PORTLAND CEMENT CLINKER COMPOSITIONS WITH AND WITHOUT FIBERS

| Screen | Clinker | Class | Fiber type and size | Fiber amount (w/w %) | Filter cake weight (grams) | Filtrate weight (grams) |
|---|---|---|---|---|---|---|
| Regular | 100 | | | | 52 | 27 |
| Regular | 90 | 10 | | | 52 | 26 |
| Regular | 80 | 20 | | | 58 | 14 |
| Regular | 70 | 30 | | | 56 | 25 |
| Wide hole | 100 | | | | 47 | 30 |
| Wide hole | 70 | 30 | | | 55 | 19 |
| Regular | 100 | | Radilock - 1.8 mm | 0.5% | 49 | 28 |
| Regular | 80 | 20 | Radilock - 3 mm | 0.5% predispersed | 54 | 24.5 (watery thin) |
| Regular | 70 | 30 | Radilock - 3 mm | 0.5% predispersed | 53.3 | 24.8 |
| Regular | 100 | | Radilock - 3 mm | 0.5% | 53 | 26 (gel) |
| Regular | 100 | | Radilock - 6 mm | 0.5% | 52 | 27 |
| Regular | 100 | | Glass - 3 mm | 1% | 52 | 25 |
| Regular | 80 | 20 | Glass - 3 mm | 0.5% predispersed | 53 | 26 (watery thin) |
| Regular | 100 | | Glass - 3 mm | 0.5% | | |
| Regular | 100 | | Particulate glass - large | 0.5% | 49 | 28 |
| Wide Slit | 100 | | | | 46 | 29 (gel) |
| Wide Slit | 90 | 10 | | | 54 | 23 (gel) |
| Wide Slit | 70 | 30 | | | 57 | 20 (watery thin) |
| Narrow Slit | 100 | | | | 51 | 24 |
| Narrow Slit | 90 | 10 | | | 59 | 19 |

Figure 6:
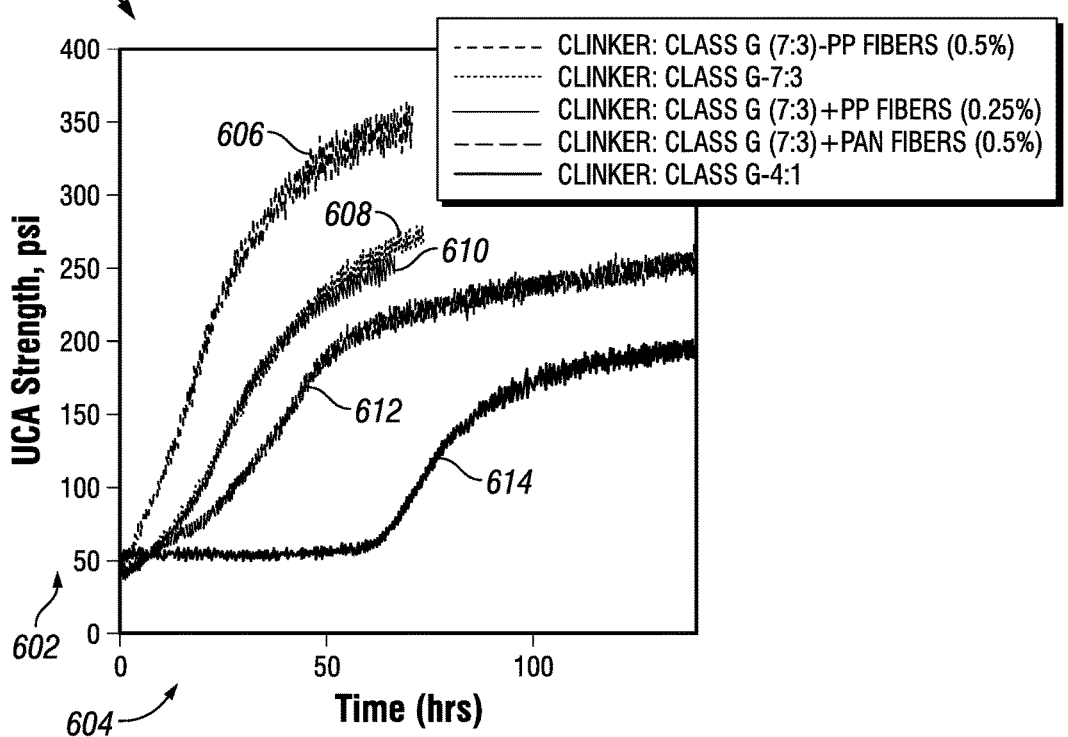
FIG. 6 is a plot of the filter cake strength (as indicated by the Ultrasonic Cement Analyzer (UCA) strength) for various Portland cement clinker compositions having API Class G cement with and without fibers in accordance with embodiments of the disclosure.

FIG. 6 is a plot 600 of the filter cake strength (as indicated by the UCA strength) for various Portland cement clinker compositions having Class G cement with and without fibers. As shown in FIG. 6, the y-axis 602 corresponds to the UCA strength in pounds per square inch (psi) and the x-axis 604 corresponds to the time in hours. FIG. 6 depicts the UCA strength for the following example compositions: a Portland cement clinker:cement weight ratio of 7:3 with 0.5 w/w % polypropylene fibers (depicted by line 606); a Portland cement clinker:cement weight ratio of 7:3 without fibers (depicted by line 608); a Portland cement clinker:cement weight ratio of 7:3 with 0.25 w/w % polypropylene fibers (depicted by line 610); a Portland cement clinker:cement weight ratio of 7:3 with 0.5 w/w % polyacrylonitrile (PAN) fibers (depicted by line 612); and a Portland cement clinker:cement weight ratio of 4:1 without fibers (depicted by line 614).

As shown in FIG. 6, polypropylene fibers at 0.5 w/w % provided higher strengths than at a lower concentration of 0.25 w/w %. The filter cake strength observed for the composition having polyacrylonitrile (PAN) fibers was lower than the filter cake strength observed for the composition having polypropylene fiber when used in identical amounts (0.5 w/w %). The polypropylene fibers were coated with a dispersant coating for efficient dispersion upon addition to water. The separation of fibers into individual filaments was more efficient and complete upon addition to water than the polyacrylonitrile fibers.

Portland Cement Clinker LCM Compositions and Use

Embodiments include a lost circulation material (LCM) composition formed from Portland cement clinker and a carrier fluid (for example, an aqueous carrier fluid). The Portland cement clinker may ASTM International Type I cement clinker, ASTM International Type V cement clinker, API Class A, and API Class G cement clinker. In other embodiments, other cement types that produce suitable cement clinker may be used. In some embodiments, an LCM composition includes cement. In some embodiments, the cement used in the LCM composition may be API Class G cement. In other embodiments, other cement types that provide suitable particle consolidation upon curing of the composition may be used. In some embodiments, the weight ratio of cement clinker to cement in the range of about 60:40 to about 90:10.

In some embodiments, the size (e.g., diameter) of the particles of the cement clinker used in the cement clinker LCM composition may be selected based on a lost circulation zone, such as based on the dimensions of openings in the lost circulation zone. For example, cement clinker that includes particles having diameters of 3 centimeters (cm) or greater may be selected for lost circulation zones having relatively large fractures and vugs or small caverns.

In some embodiments, the suspending agent used to form the carrier fluid may be xanthan gum. For example, in some embodiments, the carrier fluid may be a 0.3 wt % xanthan gum aqueous solution, a 0.6 wt % xanthan gum aqueous solution, or a 0.8 wt % xanthan gum aqueous solution. In other embodiments, the carrier fluid may be diutan gum or welan gum.

In some embodiments, the cement clinker LCM composition includes an inorganic consolidation activator, so that the cement clinker composition includes Portland cement clinker, cement, a carrier fluid, and the inorganic consolidation activator. In some embodiments, the inorganic consolidation activator may be a silicate salt such as sodium silicate. In some embodiments, the inorganic consolidation activator may include the following activators: calcium aluminate, calcium chloride, sodium aluminate, and potassium silicate, and any combination thereof. In some embodiments, the LCM composition may include combinations of inorganic consolidation activators, such as sodium aluminate and potassium silicate.

In some embodiments, the LCM composition may include an inorganic consolidation activator (or combination of inorganic consolidation activators). Thus, in such embodiments, the LCM composition may include Portland cement clinker, cement, a carrier fluid, and an inorganic consolidation activator. In some embodiments, LCM composition includes the inorganic consolidation activator in an amount in the range of about 1.0 w/w % to about 3.0 w/w %. For example, in some embodiments having two inorganic consolidation activators, the LCM composition may include a first inorganic consolidation activator in the range of 0.25 w/w % to about 1.5 w/w % and a second organic consolidation activator in a corresponding amount in the range of about 0.25 w/w % to about 1.5 w/w %.

In some embodiments, the cement clinker LCM composition includes a crosslinked fluid as the carrier fluid. In some embodiments, the crosslinking fluid is a polyuronide. In such embodiments, the cement clinker LCM composition includes Portland cement clinker, a carrier fluid, and the crosslinking fluid. The polyuronide may include, for example, alginates and pectinates. In some embodiments, the polyuronide may be apple pectin, citrus pectin, or sodium alginate. In some embodiments, the LCM composition may include the polyuronide crosslinking fluid in an amount of 0.5 w/w % by weight of water to about 3 w/w % by weight of water. In such embodiments, the crosslinking fluid is crosslinked by calcium ions leached or released from the clinker when mixed with the polyuronide.

In other embodiments, the crosslinking fluid is a biopolymer crosslinked using divinyl sulfone (DVS). In such embodiments, the cement clinker LCM composition includes Portland cement clinker, a carrier fluid, the biopolymer crosslinking fluid, and DVS. In such embodiments, the crosslinking fluid may include xanthan gum, hydroxyethyl cellulose, diutan gum welan gum, and guar gum, or combinations thereof. For example, in some embodiments the crosslinking fluid may be a combination of xanthan gum and guar. In some embodiments, LCM composition may include a biopolymer crosslinking agent in an amount of about 0.5 w/w % to about 0.8 w/w %. In some embodiments, the LCM composition includes a weight ratio of biopolymer to DVS in the range of about 1:1 to 1:0.5. In some embodiments, the LCM composition having a biopolymer crosslinking fluid may include a base such as sodium hydroxide (NaOH) in an amount sufficient to adjust the pH of the LCM composition to about 8.5 or, in some embodiments, greater than 8.5. In such embodiments, prior to addition of the clinker, the biopolymer aqueous solution may be mixed with DVS and sufficient sodium hydroxide added to raise the pH to 8.5, following by heating to at least 150° F. until the viscosity begins to increase. In some embodiments, an LCM composition having a crosslinked fluid as the carrier fluid may include cement clinker having particles with a diameter greater than 1 cm, greater than 2 cm, greater than 3 cm, or a combination thereof. In some embodiments, the cement clinker may include particles defined by one or more mesh sizes, such that the cement clinker excludes particles outside of those defined by the one or more mesh sizes. For example, the cement clinker particles may only include particles passed by a first mesh size but retained on a second mesh size. In some embodiments, the cement clinker particles may be sized based on the sizes of fractures in a lost circulation zone. For example, in such embodiments, the D50 particle size distribution of the cement clinker particles may be ⅓ of the width of fractures in the lost circulation zone (e.g., ⅓ the width of the average fracture size in the lost circulation zone).

In some embodiments, the cement clinker LCM composition includes polymer fibers. In such embodiments, the cement clinker LCM composition includes Portland cement clinker, cement, a carrier fluid, and polymer fibers. In some embodiments, the polymer fibers are polypropylene fibers. In some embodiments, the polypropylene fibers may be coated with a dispersant to improve the dispersion in water. In some embodiments, the polymer fibers are polyacrylonitrile fibers. In other embodiments, other suitable polymer fibers may be used. In some embodiments, LCM composition may include polymer fibers in an amount in the range of 0.25 w/w % to about 1.0 w/w %. In some embodiments, the polymer fibers have a length in the range of about 1 mm to about 6 mm.

In some embodiments, the cement clinker LCM composition includes particulate glass with an aspect ratio greater or less than 1. In such embodiments, the cement clinker LCM composition includes Portland cement clinker, cement, a carrier fluid, and particulate glass. In such embodiments, the LCM composition may include particulate glass in an amount in the range of about 0.25 w/w % to about 2.0 w/w %. In some embodiments, the particulate glass may be glass fibers having a length in the range of about 1 mm to about 6 mm.

The cement clinker LCM compositions described herein may be used in a variety of manners to mitigate or prevent lost circulation in a lost circulation zone. The cement clinker LCM compositions may be mixed with a fluid, such as water or a drilling fluid, and introduced (e.g., pumped) downhole at parameters (pump rate, pressure, etc.) sufficient to position the cement clinker LCM composition into contact with a lost circulation zone, such that the cement clinker LCM alters the lost circulation zone. In some embodiments, the cement clinker LCM compositions may be formed as a fluid pill and introduced (e.g., pumped) downhole to contact a lost circulation zone. The cement clinker LCM compositions described herein may be used, for example, during drilling operations, cementing operations, or other operations for which reducing or prevent loss of fluid is desirable.

In some embodiments, the cement clinker LCM compositions may be allowed to interact with the lost circulation zone for a period to enable the in-situ formation of solids as a result of the interaction between the components of the cement clinker LCM composition. The formed solids may alter the lost circulation zone (for example, by entering and blocking porous and permeable paths, cracks, and fractures in a formation in the lost circulation zone, such as forming a structure in a mouth or within a fracture). In some embodiments, the interaction period may be in the range of about 24 hours to about 72 hours.

The cement clinker LCM compositions may provide for easier pumping of the LCM due to the suspension of the clinker particles. Moreover, the environmentally friendly properties of the cement clinker LCM compositions may minimize or prevent any environmental impact and effect on ecosystems, habitats, population, crops, and plants at or surrounding the drilling site where the cement clinker LCM compositions are used.

Ranges may be expressed in the disclosure as from about one particular value, to about another particular value, or both. When such a range is expressed, it is to be understood that another embodiment is from the one particular value, to the other particular value, or both, along with all combinations within said range.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used described in the disclosure are for organizational purposes only and are not meant to be used to limit the scope of the description.

What is claimed is:

1. A lost circulation material (LCM) composition, comprising:
   Portland cement clinker, wherein the Portland cement clinker consists of non-hydraulic, non-cementiceous unground Portland cement clinker particles;
   cement, wherein the cement comprises API Class G cement; and
   a carrier fluid.

2. The LCM composition of claim 1, wherein the Portland cement clinker comprises ASTM International Type I cement clinker, ASTM International Type V cement clinker, API Class A cement clinker, or API Class G cement clinker.

3. The LCM composition of claim 1, wherein the weight ratio of carrier fluid to cement clinker is 1:1.

4. The LCM composition of claim 1, wherein the weight ratio of cement clinker to cement is in the range of 60:40 to 90:10.

* * * * *